(No Model.)
H. E. EVANS.
CORD OR TWINE CUTTER.
No. 587,716. Patented Aug. 10, 1897.
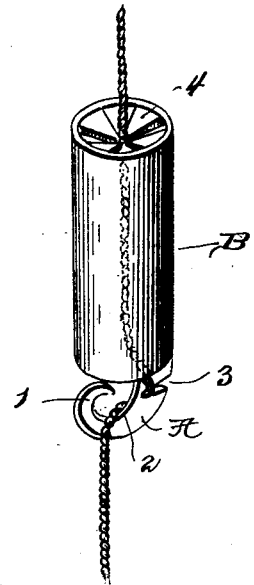
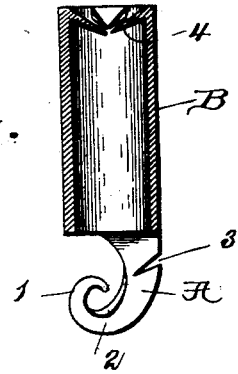
Witnesses
Marcus L. Byng.
K. A. Nau.
Inventor,
Hattie E. Evans,
by John Wedderburn
Attorney

UNITED STATES PATENT OFFICE.

HATTIE EDITH EVANS, OF KINCARDINE, CANADA.

CORD OR TWINE CUTTER.

SPECIFICATION forming part of Letters Patent No. 587,716, dated August 10, 1897.

Application filed July 3, 1896. Serial No. 597,943. (No model.)

*To all whom it may concern:*

Be it known that I, HATTIE EDITH EVANS, a subject of the Queen of Great Britain, residing at Kincardine, Ontario, Canada, have invented certain new and useful Improvements in Cord or Twine Cutters; and I do hereby declare the following to be a full, clear, and exact description of the invention, such as will enable others skilled in the art to which it appertains to make and use the same.

My invention relates to cord or twine cutters.

My object is to provide a simple, cheap, and superior cord or twine cutter which will be adapted for use in all connections where thread, cord, or twine is used.

A further object is to provide a cutter of the class described of such novel construction that it will be adapted to more perfectly hold the cord while being cut.

Having the foregoing objects in view, my invention consists of a cutter of the class described comprising certain improved features and novel combinations of parts more fully set forth in the following description and recited in the appended claim.

In the accompanying drawings, Figure 1 is a perspective view of my improved thread, cord, or twine cutter, showing it in use in connection with the end of a ball of cord from which lengths are to be cut; Fig. 2, a longitudinal sectional view of a cutter.

Referring now to Figs. 1 and 2, A designates the cutting-blade. This is provided with a hooked end 1, and 2 designates a curved cutting edge. I find that by thus forming the blade into a hook the thread or cord is more perfectly caught on the blade while being cut. It is obvious that the upper portion of the blade could be of any desired shape and it is desirable that the hook be provided. The back of the blade is provided with a notch 3, which is quite narrow, but of sufficient size to accommodate the thread, cord, or twine being cut, and the purpose of this notch is to receive the cord and hold it to prevent it from sliding while being drawn across the cutting edge. The blade is formed integral with the cylindrical body B and open from end to end. The end of this body is formed into a series of prongs 4, which are inclined so that they project into the open body toward the cutting-blade.

The cutter just described is adapted for use in connection with a ball of cord or twine from which lengths have to be cut off at different times. The end of the cord is passed down between the prongs 4 and through the body B. After a suitable length of cord has been drawn through the cord is pressed into notch 3, so that it will be held against slipping, and it is then brought around the cutting-blade and drawn over the hooked cutting edge, whereupon it will be cut off.

Having now described my invention, what I claim as new, and desire to secure by Letters Patent, is—

A cord-cutter comprising a hooked cutting-blade having a notch for holding the cord and preventing it from slipping, an open body through which the cord passes, and inwardly-projecting prongs which are inclined toward the cutting-blade and are adapted to engage with the cord and prevent the cord from slipping.

In testimony whereof I have signed this specification in the presence of two subscribing witnesses.

HATTIE EDITH EVANS.

Witnesses:
 HELEN B. LEADBETTER,
 LOFTUS KURTHEL.